Figure 1:
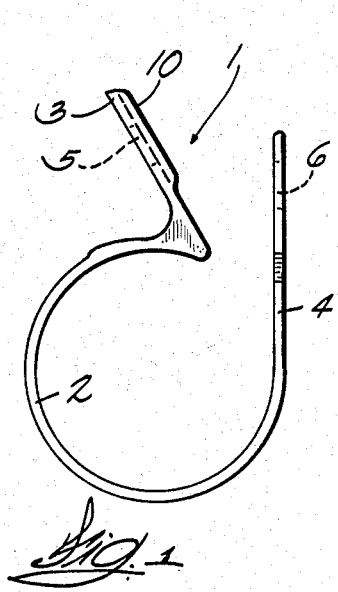

United States Patent [19]

Downing et al.

[11] Patent Number: 4,535,960
[45] Date of Patent: Aug. 20, 1985

[54] CABLE CLAMP WITH ALIGNMENT MEANS

[75] Inventors: Gerald T. Downing, Port Washington; Gregory W. Gyllstrom, Waukesha, both of Wis.

[73] Assignee: W. H. Brady Co., Milwaukee, Wis.

[21] Appl. No.: 507,650

[22] Filed: Jun. 27, 1983

[51] Int. Cl.³ .............................................. F16L 3/08
[52] U.S. Cl. ................................... 248/74.5; 248/68.1
[58] Field of Search ............... 248/74.5, 68.1, 74.1, 248/74.3; 24/16 PB, 458, 533, 459, 483

[56] References Cited

U.S. PATENT DOCUMENTS

| | | | |
|---|---|---|---|
| 1,462,671 | 7/1923 | Urba | 248/74.5 |
| 2,683,578 | 7/1954 | Rainey | 248/68.1 |
| 3,815,855 | 6/1974 | Appleton | 248/74.5 |
| 3,995,795 | 12/1976 | Hogan | 248/68.1 |

FOREIGN PATENT DOCUMENTS

| | | | |
|---|---|---|---|
| 90780 | 1/1958 | Norway | 248/74.5 |
| 956751 | 4/1964 | United Kingdom | 248/74.5 |

Primary Examiner—J. Franklin Foss
Attorney, Agent, or Firm—Quarles & Brady

[57] ABSTRACT

A cable clamp (1, 20, 30) including an arcuate central body portion (2) which is to encircle a cable (15), a first flat end portion (3) and a second flat end portion (4) extending from opposite ends of the central body portion, and apertures (5, 6) in each flat end portion. One end portion has a peripheral flange (10) extending therefrom and the other has a tongue (11) proportioned to nest within the flange when the two end portions are brought together, thereby providing accurate registration of the apertures (5, 6) in the two end portions.

7 Claims, 8 Drawing Figures

U.S. Patent  Aug. 20, 1985  4,535,960

CABLE CLAMP WITH ALIGNMENT MEANS

This invention relates to a cable clamp of the type comprising a central body portion which encompasses a cable or group of cables and end portions extending from each end of the body portion which are superimposed for attaching the clamp to an object, such as a wall, with a fastener extending through the end portions.

The foregoing type of cable clamp typically has flat end portions which are to be superimposed when attaching the clamp to an object, with an aperture extending through each end portion. The two apertures must be aligned with one another so that a fastener, such as a screw, bolt, or other suitable device, can be inserted through the apertures. If the apertures are not properly aligned with one another, it is difficult to secure the clamp to an object in a quick and efficient manner. Cable clamps are often molded of plastic material, such as nylon, and can be rather stiff so that it can be difficult to obtain accurate alignment of the end portions and apertures therein and retain the alignment while a fastener is inserted through the apertures and secured to an object. Improper alignment of the attachment apertures can also result in insecure clamping of the wire or wires intended to be held by the clamp.

The above problems are inherent with the typical prior art cable clamp which has two end portions which are flat so that it is easy for the two end portions to slide relative to one another, thereby increasing the difficulty of obtaining correct alignment of the two end portions. One prior art solution is to mold plastic cable clamps in which one end portion has one or more small projections and the other mating recesses; when attaching the clamp to a panel, the projections are to fit into the recesses to align the two end portions. However, this structure has not proved satisfactory for obtaining and maintaining suitable alignment, because the recesses form weakened areas which can lead to mechanical failure of the cable clamp and, further, it is not practical to make the projections long enough and recesses deep enough to permit the desired level of alignment.

The goal of the research work which led to the present invention was to develop a new cable clamp that would cure the deficiencies of the presently known cable clamp structures, particularly the structures noted above. This has culminated in the cable clamp of the present invention which comprises, in a cable clamp of the type including (a) a curved central body portion for encircling one or more cables, (b) a first flat end portion extending from one end of the central body portion, (c) a second flat end portion extending from the other end of the body portion, and (d) an attachment aperture through each end portion, the improvement in which one of the end portions has an upstanding flange extending about a part of its perimeter and the other end portion includes a tongue sized to nest within the flange. This provides accurate alignment of the attachment apertures extending through the two end portions substantially facilitates maintaining the alignment during the fastening of the cable clamp to a panel, and enhances the mechanical strength of the cable clamp.

Figure 2:
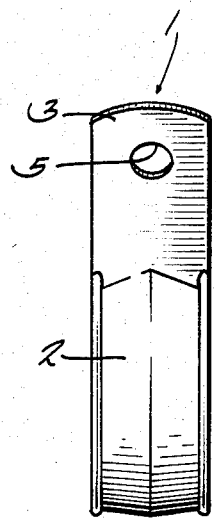
Figure 3:
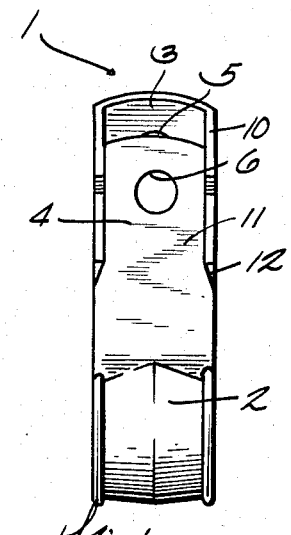
Figure 4:
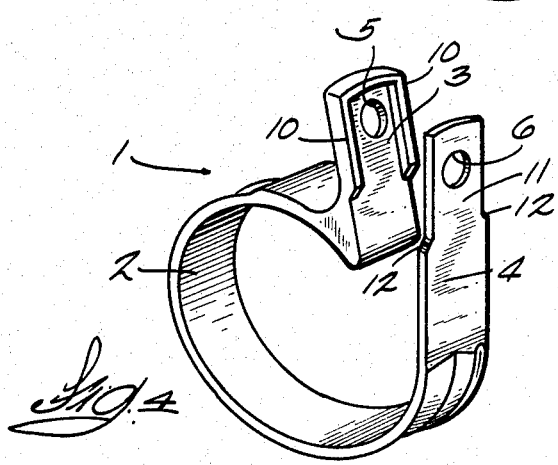
Figure 5:
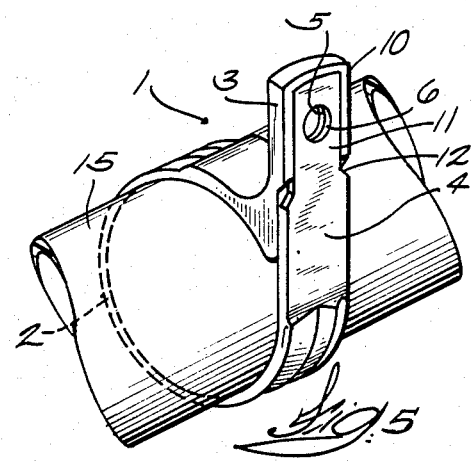
Figure 6:
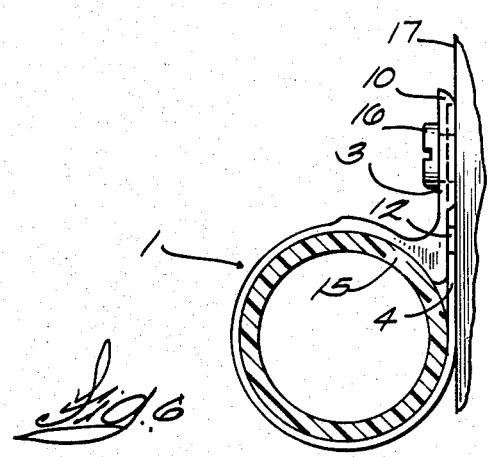
Figure 7:
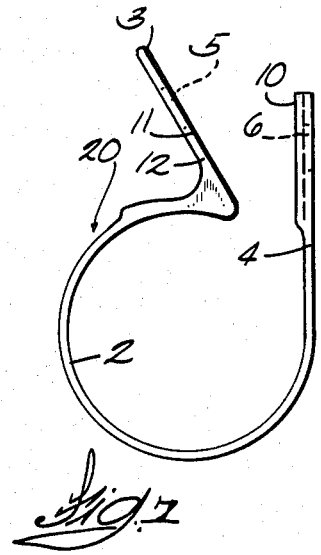
Figure 8:
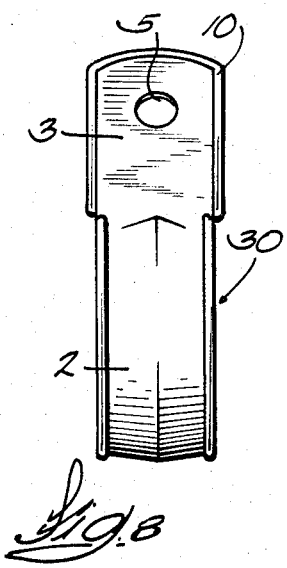

The invention is described in such full and concise detail as to fully teach its principles to those skilled in the art as required by 35 U.S.C. §112 in the ensuing description made by reference to the following drawings, in which:

FIG. 1 is a side view of a cable clamp according to the present invention;
FIG. 2 is a front view of the cable clamp;
FIG. 3 is a rear view of the cable clamp;
FIG. 4 is a perspective view of the cable clamp;
FIG. 5 is a perspective view of the cable clamp positioned about a cable;
FIG. 6 is a side view of the cable clamp positioned about a cable and secured to a wall panel with a fastener;
FIG. 7 is a side view of a second embodiment of the cable clamp of this invention; and
FIG. 8 is a front view of a third embodiment of the cable clamp of this invention.

An embodiment of our new cable clamp is illustrated in FIGS. 1-6 and comprises a cable clamp 1 formed as a narrowband of molded plastic which is made in various sizes to accommodate different sizes of wire or cable. The cable clamp may be made of any suitable material such as nylon, polyolefin, etc.

The cable clamp 1 includes an arcuate central body portion 2 which is intended to encircle and encompass one or more cables or tubular articles, a first flat end portion 3 extending from one end of the central body portion, and a second flat end portion 4 extending from the opposite end of the central body portion. The first end portion 3 extends at an acute angle from the central body portion 2 when the clamp is in the condition illustrated in FIGS. 1-4, and the second end portion 4 extends linearly from the central body portion. The two end portions are adapted to be superimposed upon one another in a flat position when the clamp is to be fastened to an object.

As best seen in FIG. 4, an aperture 5 is formed through the first end portion 3 and an aperture 6 is formed through the second end portion 4. The apertures 5 and 6 are positioned so as to be in registry with one another when the two end portions are brought together. A peripheral flange 10 extends from the rear surface of the first end portion 3 and is shown in the illustrative embodiment as extending about two sides and the outer end of the end portion 3. The second end portion 4 has a tongue 11 at its extremity, that is somewhat narrower in width than the balance of the end portion 4 and is connected thereto along shoulders 12, which is sized to nestle within the peripheral flange 10 of the first end portion 3.

Turning now to FIG. 5, when the cable clamp is inserted about an article such as an insulated electrical cable 15, the end portions 3 and 4 are brought into engagement with one another and the tongue 11 of the second end portion 4 fits within the peripheral flange 10 extending from the first end portion 3. This nested engagement between the tongue and the peripheral flange of the two end portions maintains accurate alignment of the end portions relative to one another. Because the end portion 4 cannot slide relative to the end portion 3 when nested in this fashion, the alignment can be accurately and conveniently maintained. This also prevents one end portion from twisting or skewing relative to the other when the cable clamp is attached with a fastener such as a screw which can impose torsional forces as it is threaded into a panel or other object. Furthermore, when the end portions are aligned with one another, the aperture 5 extending through the first flat end portion 3 and the aperture 6 of the second flat end portion 4 are in accurate registration with one another.

With the end portions 3 and 4 nested together as described above, the cable clamp 1 is ready to be attached to an object such as the wall panel 17 shown in FIG. 6. A suitable fastener, such as screw 16, is inserted through the registered openings 5 and 6 and secured to the wall panel to attach the cable clamp to the wall and thereby hold the cable 15 in the desired position.

As indicated in FIG. 6, the flange 10 extending from the first end portion 3 is most usefully of the same thickness as the end portion 4 so that the tongue thereof is fully surrounded by the flange. However, the flange may also be made thinner than the tongue, while still obtaining the benefit of the alignment means of the cable clamp of the present invention.

FIG. 7 illustrates a second embodiment of this invention comprising cable clamp 20 wherein the flange 10 extends forwardly from the second flat end portion 4 and the first flat end portion 3 includes a tongue 11 at its extremity which is positioned and arranged to nest within the flange 10 when the end portions 3 and 4 are brought together. In this version, the flange 10 extends forwardly from the flat end portion 4 which is normally positioned to the rear of the end portion 3, as compared to the embodiment of FIGS. 1-6 in which the flange extends rearwardly from the end portion 3 which is normally along the front of the clamp when installed.

FIG. 8 illustrates cable clamp 30 as a third embodiment of our new cable clamp in which the flange 10, (which is shown on the flat end portion 3 but it may also be located on the flat end portion 4) extends outwardly from the perimeter of the cable clamp 30 instead of being positioned inwardly thereof as in the prior two embodiments. The other end portion 4 would thereby be of the same width as the balance of the cable clamp and its end section forms the tongue 11 for nesting within the flange 10 in the manner illustrated in connection with the prior embodiments.

The cable clamps as described above, incorporating alignment means for securing accurate registration of the two end portions with respect to one another, can be used to attach various objects, such as insulated electrical wire, tubing, hose, etc., to a flat panel such as wall. The ability to obtain accurate registration of the two end portions in a convenient and sure manner greatly aids in properly securing the cable clamps to an object. The mechanical interengagement of the two end portions as described also provides a positive alignment feature, so that the user is made aware of the fact that proper engagement of the two end portions has been made. Moreover, the alignment means of the new cable clamps, including the peripheral flange and tongue combination, also imparts mechanical strength to the clamps so as to reduce structural failure of the clamps when loaded. Our new cable clamps thereby obviate many of the difficulties experienced with prior art forms of cable clamps of the general type under consideration.

Various other changes can be made in the embodiments of our cable clamp described above that are within the framework and concept of the present invention. While the flange 10 is illustrated as a peripheral flange extending about three sides of an end portion, which is presently believed to be the most useful form of the present invention, it also is possible to form the flange to extend about less than three sides of the end portion or as a set of spaced flanges rather than a continuous flange as illustrated. It is to be understood that changes and modifications in the form, construction, and arrangement of the several parts of the cable clamp described hereinabove may be made and substituted for those shown and described without departing from the nature and principles of this invention, and all such changes and modifications are intended to be encompassed within the scope of the appended claims.

We claim:

1. In a cable clamp of the type including an arcuate central body portion, a first flat end portion extending from one end of the central body portion, a second flat end poriton extending from the opposite end of the central body portion, and an aperture in the first flat end portion and an aperture in the second flat end portion, the improvement wherein:
   (1) one of the flat end portions includes a peripheral flange extending toward the other flat end portion,
   (2) the other flat end portion includes a tongue proportioned to nest within the peripheral flange when the first and second end portions are in engagement with one another, whereby the apertures in the two flat end portions are in registry for attachment of the cable clamp to an object upon engagement of the first and second flat end portions.

2. A cable clamp according to claim 1, wherein:
   the peripheral flange extends about two sides and an end of a flat end portion.

3. A cable clamp according to claim 1, wherein:
   the peripheral flange extends from the one flat end portion a distance equal to substantially the thickness of the other flat end portion of the cable clamp.

4. A cable clamp according to claim 1, wherein:
   the first flat end portion is positioned along the front of the cable clamp and the peripheral flange extends rearwardly therefrom towards the second end portion which is positioned along the rear of the clamp.

5. A cable clamp according to claim 1, wherein:
   the first flat end portion is positioned along the front of the cable clamp and the second flat end portion is positioned along the rear of the cable clamp, and the peripheral flange extends from the second end portion forwardly towards the first end portion.

6. A cable clamp according to claim 1, 2, 3, 4 or 5 wherein:
   the tongue is formed as a narrowed portion of an extremity of the flat end portion of which it forms a part.

7. A cable clamp according to claim 1, 2, 3, 4 or 5, wherein:
   the tongue comprises an end section of the flat end portion of which it forms a part and is of the same width as said flat end portion.

* * * * *